United States Patent
Wu

(10) Patent No.: US 10,551,729 B2
(45) Date of Patent: Feb. 4, 2020

(54) PROJECTOR WITH NOTCH FILTER

(71) Applicant: DELTA ELECTRONICS, INC., Taoyuan (TW)

(72) Inventor: Kuo-Tung Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/125,791

(22) Filed: Sep. 10, 2018

(65) Prior Publication Data

US 2019/0369476 A1 Dec. 5, 2019

(30) Foreign Application Priority Data

May 30, 2018 (CN) .......................... 2018 1 0540495

(51) Int. Cl.
  *G03B 21/20* (2006.01)
  *G02B 5/20* (2006.01)
(52) U.S. Cl.
  CPC ..... *G03B 21/2093* (2013.01); *G03B 21/2053* (2013.01); *G02B 5/201* (2013.01)
(58) Field of Classification Search
  CPC G03B 21/20; G03B 21/2013; G03B 21/2053; G03B 21/2093
  See application file for complete search history.

(56) References Cited

U.S. PATENT DOCUMENTS

| | | | |
|---|---|---|---|
| 3,215,036 A | 11/1965 | Kirkconnell | |
| 2004/0212895 A1* | 10/2004 | Pate | G02B 5/289 359/634 |
| 2006/0087624 A1* | 4/2006 | Przybyla | G03B 21/20 353/84 |
| 2007/0188718 A1* | 8/2007 | Yang | H04N 9/3114 353/84 |
| 2015/0124429 A1 | 5/2015 | Hoehmann | |
| 2018/0052099 A1 | 2/2018 | Hill et al. | |
| 2019/0037185 A1* | 1/2019 | Tarpan | H04N 9/3182 |

FOREIGN PATENT DOCUMENTS

| | | |
|---|---|---|
| CN | 104613418 A | 5/2015 |
| CN | 206470475 U | 9/2017 |
| TW | 1403822 B1 | 8/2013 |
| TW | 201809796 A | 3/2018 |

* cited by examiner

*Primary Examiner* — Sultan Chowdhury
(74) *Attorney, Agent, or Firm* — CKC & Partners Co., LLC

(57) ABSTRACT

A projector includes a light-emitting device, a color wheel, a notch filter, a switching device, and a light controller. The light-emitting device is configured to emit a light. The color wheel is disposed on a path of the light and is configured to produce lights with different color wave bands. The notch filter has two cut-off waveband, and each is located between adjacent two of the color wavebands. The switching module is configured to move the notch filter to or away the path of the light. The light controller is electrically connected to the light-emitting device and the switching module, and is configured to control an intensity of the light emitted by the light-emitting device.

12 Claims, 15 Drawing Sheets

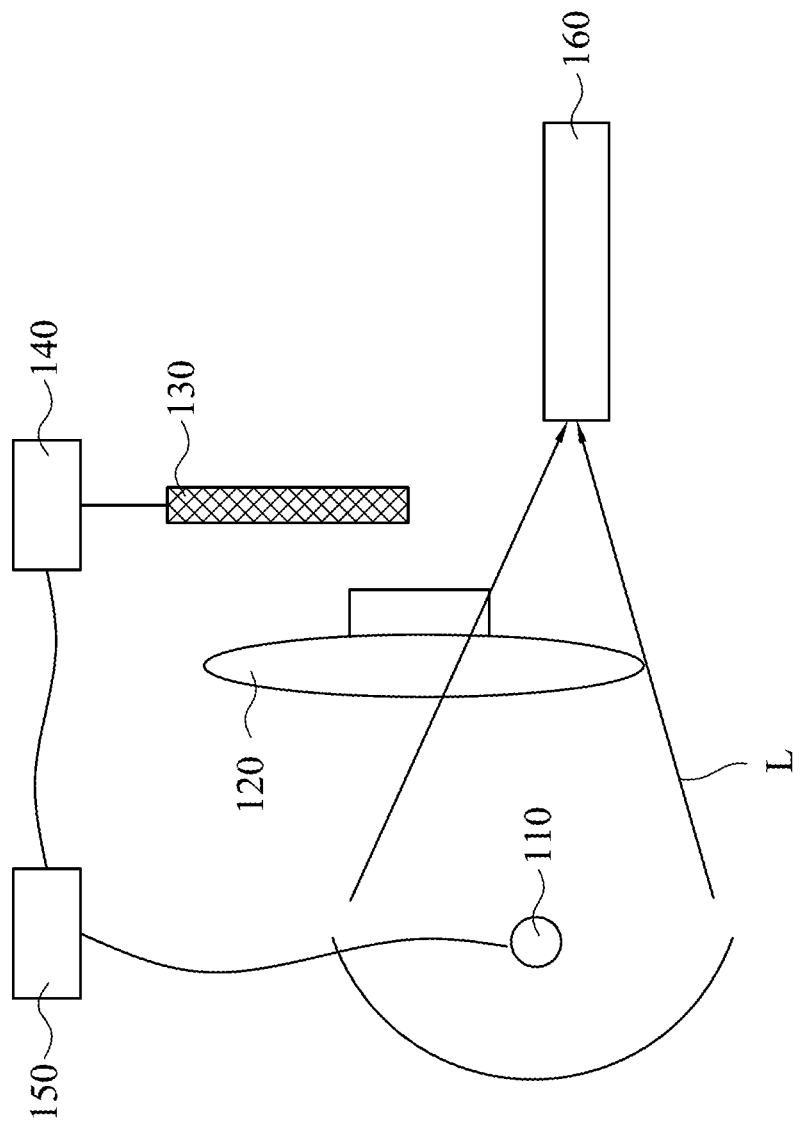

PROJECTOR WITH NOTCH FILTER

RELATED APPLICATIONS

This application claims priority to China Application Serial Number 201810540495.5, filed May 30, 2018, which is herein incorporated by reference.

BACKGROUND

Field of Invention

The present invention is related to the field of projectors.

Description of Related Art

Projectors have been widely applied to various situations nowadays, such as office briefings, video playing, installation art, and so on. It is obvious that a required projection effect should be varied depending on the applied situation. In the cases that the projected contents are mostly text, tables, or lists, the luminosity contrast could be of the most importance; and in the cases that the projected contents are films or media image, the chromaticity (the color gamut) could strongly affect quality of exhibited images.

There is a tradeoff between intensity and chromaticity, and thus conventional projectors should be designed according to the applied conditions. For example, conventional projectors may be designed with a relative high intensity and a relative narrow color gamut, or a relative low intensity but a relative wide color gamut. However, once the applied condition has been determined, the designed conventional projector would have a poor performance under other conditions, and the application range is thus limited. As a result, how to design a projector that is capable of being applied to various situations is in immediate need in the industry.

SUMMARY

The invention provides a projector includes a light-emitting device, a color wheel, a notch filter, a switching device, and a light controller. The light-emitting device is configured to emit a light. The color wheel is disposed on a path of the light and is configured to produce lights with different color wave bands. The notch filter has two cut-off waveband, and each is located between adjacent two of the color wavebands. The switching module is configured to move the notch filter to or away the path of the light. The light controller is electrically connected to the light-emitting device and the switching module, and is configured to control an intensity of the light emitted by the light-emitting device.

In some embodiments, the color wavebands includes a red waveband, a green waveband, a blue waveband, and a white waveband, and one of the cut-off wavebands of the notch filter is located between the red waveband and the green waveband, and the other one of the cut-off wavebands of the notch filter is located between the green waveband and the blue waveband.

In some embodiments, two half-transmission wavelengths (T50%) of one of the cut-off waveband of the notch filter are 460 nm and 485 nm respectively, and two half-transmission wavelengths (T50%) of the other one of the cut-off waveband of the notch filter are 575 nm and 600 nm respectively.

In some embodiments, when the notch filter is located off the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the white waveband. The fourth current intensity is greater than the second current intensity, the second current intensity is greater than the first current intensity, and the first current intensity is equal to the third current intensity.

In some embodiments, when the notch filter is located off the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the whit waveband. The first current intensity is greater than the third current intensity, the third current intensity is greater than the second current intensity, and the second current intensity is greater than the fourth current intensity.

In some embodiments, when the notch filter is located on the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the whit waveband. The first current intensity is greater than the third current intensity, the third current intensity is greater than the fourth current intensity, and the fourth current intensity is greater than the second current intensity.

In some embodiments, the color wavebands include a red waveband, a green waveband, and a blue waveband, and one of the cut-off wavebands of the notch filter is located between the red waveband and the green waveband, and the other one of the cut-off wavebands of the notch filter is located between the green waveband and the blue waveband.

In some embodiments, when the notch filter is located on the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband. The first current intensity is greater than the second current intensity, and the second current intensity is equal to the third current intensity.

In some embodiments, when the notch filter is located off the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband. The second current intensity is greater than the first current intensity, and the first current intensity is greater than the third current intensity.

In some embodiments, when the notch filter is located on the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband. The first current intensity is greater than the second current intensity, and the second current intensity is equal to the third current intensity.

In some embodiments, the notch filter further includes a first transparent substrate, a first coating layer, a second transparent substrate, and a second coating layer. The first coating layer is disposed on the first transparent substrate, and the first coating layer makes the notch filter has a first cut-off waveband, in which two half-transmission wavelengths of the first cut-off waveband are 460 nm and 485 nm respectively. The second coating layer is disposed on the second transparent substrate, and the second coating layer makes the notch filter has a second cut-off waveband, in which two half-transmission wavelengths of the second cut-off waveband are 575 nm and 600 nm respectively. The second transparent substrate is attached to the first transparent substrate.

Under above design, the projector may be adapted to various projection circumstances without changing the color wheel and the light modulating elements. For example, when using the projector to deliver a presentation in a conference, it is required a high luminosity, while a requirement of a chromaticity is relatively low. In such situation, the notch filter may be moved away from the path of the light by the switching module to make the projector achieve a high intensity mode. In other applications, such as playing photo, video, or movie, the requirement of the chromaticity of the projector is higher, and thus the notch filter may be moved to the path of the light by the switching module to make the projector achieve a high chromaticity mode. In sum, users may use the switching module to switch the projector between the high intensity mode and the high chromaticity mode. In addition, by installing the light controller with different settings, the projection quality of the projector in the high intensity mode and in the high chromaticity mode may be further tuned according to different applications. And also, by appropriately designing the notch filter, the overall intensity and primary color purity of the projector may be optimized in general.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1A illustrates a schematic diagram of a projector according to an embodiment of the present disclosure, in which a notch filter is located off a path of a light;

DETAILED DESCRIPTION

Figure 1B:
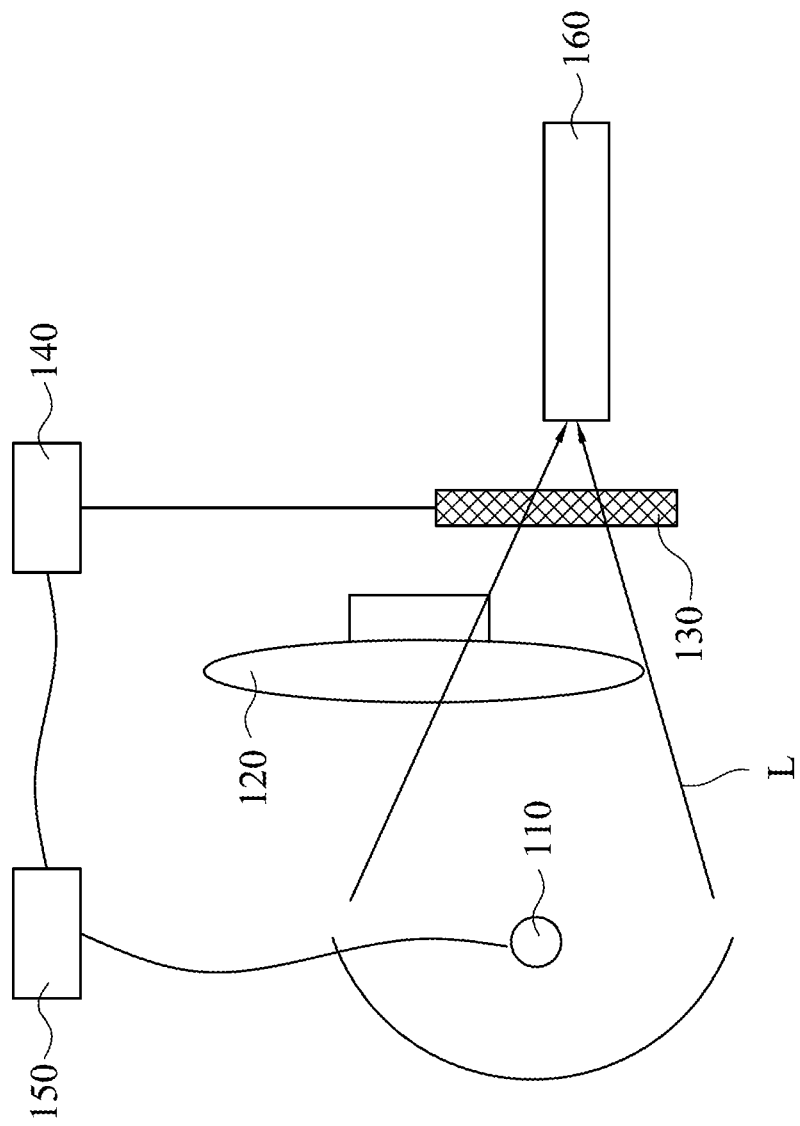
FIG. 1B illustrates a schematic diagram of the projector shown in FIG. 1A, which is switched to another state, in which the notch filter is located on the path of the light.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1A and FIG. 1B. FIG. 1A illustrates a schematic diagram of a projector 100 according to an embodiment of the present disclosure, in which a notch filter 130 is located off a path of a light L. FIG. 1B illustrates a schematic diagram of the projector 100 shown in FIG. 1A, which is switched to another state, in which the notch filter 130 is located on the path of the light L.

As shown in FIG. 1A and FIG. 1B. The projector 100 includes a light-emitting device 110, a color wheel 120, a notch filter 130, a switching module 140, and a light controller 150. The light-emitting device 110 is configured to emit a light L. The color wheel 120 is disposed on a path of the light L, and the color wheel 120 is configured to change the light L into a plurality of lights with different color wavebands. The notch filter 130 has two cut-off wavebands, and each of the cut-off wavebands is located between adjacent two of the color waveband. The switching module 140 is configured to move the notch filter 130 to the path of the light L (as shown in FIG. 1A) or away the path of the light L (as shown in FIG. 1B). The light controller 150 is electrically connected to the light-emitting device 110 and the switching module 140, and the light controller 150 is configured to control an intensity of the light L emitted by the light-emitting device 110.

Figure 2:
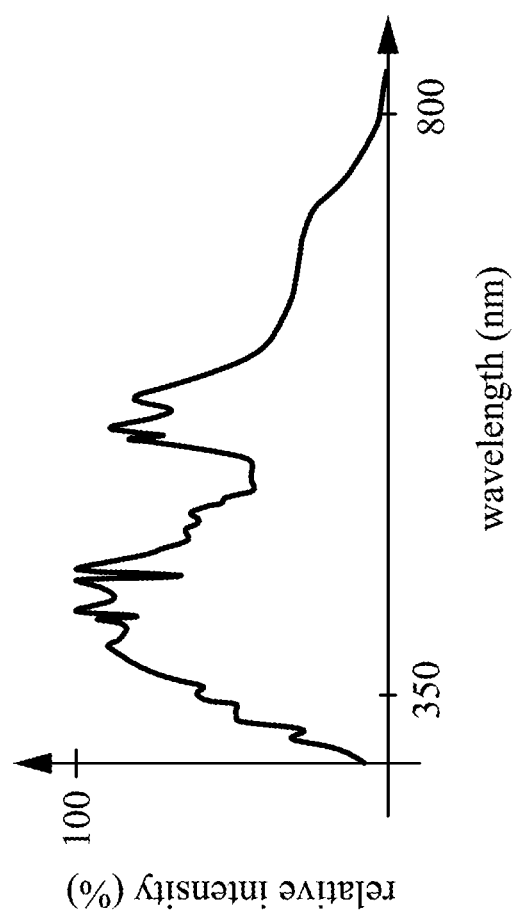
FIG. 2 illustrates an intensity-wavelength diagram of the light emitted by the light-emitting device shown in FIG. 1A and FIG. 1B.

Please refer to FIG. 2, which illustrates an intensity-wavelength diagram of the light L emitted by the light-emitting device 110 shown in FIG. 1A and FIG. 1B. As shown in FIG. 2, a waveband of the light L emitted by the light-emitting device 110 may cover most of the visible waveband. In other words, the light L may appear to be white in human eyes. In the present embodiment, the light-emitting device 110 is a UHP light. In other embodiment, the light-emitting device 110 may be a light emitting diode (LED). In some embodiments, the light-emitting device 110 may include plural light sources emitting different color lights. For example, the light-emitting device 110 includes red LEDs, blue LEDs, and green LEDs, and the white light may be generated by combining the red, green and blue lights. In sum, the light-emitting device 110 may be a white light source of various types, and the present disclosure is not limited thereto.

Figure 3:
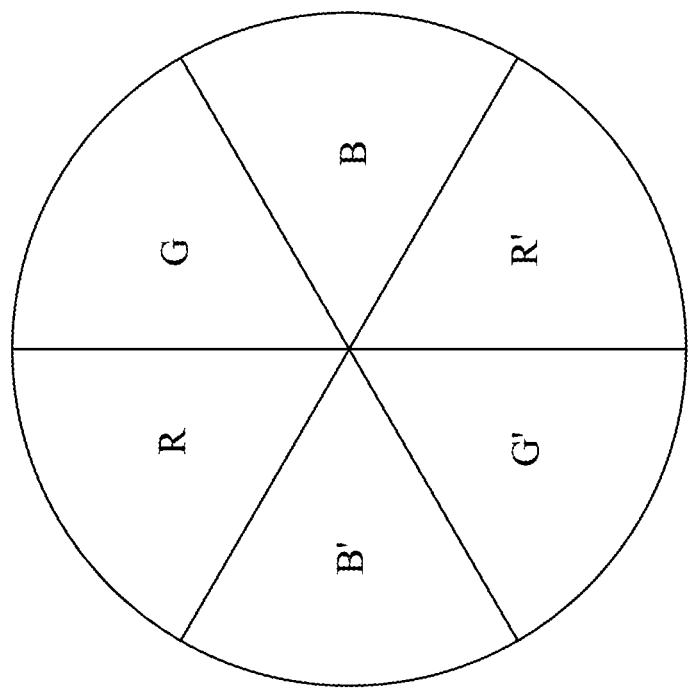
FIG. 3 which illustrates a plane view of the color wheel shown in FIG. 1A.

Please refer to FIG. 3, which illustrates a plane view of the color wheel 120 shown in FIG. 1A. As the embodiment shown in FIG. 3, the color wheel 120 is a tri-color color wheel, which has six light-pass areas. The light-pass areas permit lights with different wavebands to pass through respectively. In particular, the six light-pass areas are red-pass area R, blue-pass area B, green-pass area G, red-pass area R', blue-pass area B', and green-pass area G' respectively. When the color wheel 120 is rotating, the light L would pass through different light-pass areas in a chronological order, and thus the light L would be changed into different color lights. The color lights may then be used as primary colors for the projector 100 to display colorful images. For example, in a first timing t1, the light L passes through the red-pass area R and the light L is changed into a red light; in a second timing t2, the light L passes through the green-pass area G and the light L is changed into a green light; and in a third timing t3, the light L passes through the blue-pass area B and the light L is changed into a blue light. As a result, the three primary colors used to display images in the present embodiment are red, green, and blue respectively.

The color wheel 120 illustrated in FIG. 3 is only an exemplified embodiment of the tri-color color wheel. In the present embodiment, the plate is divided into six equal areas; but in other embodiments, scale of each area may be adjusted according to property of the light L emitted by the light-emitting device 110. In some embodiments, the color wheel 120 may be divided into three areas, and the red-pass, green-pass, and blue-pass area is arranged in a clockwise order. In sum, any color wheel 120 that may chronologically change the light L into color lights with three different color wavebands would be appropriate, the color wheel 120 is not limited to the one illustrated in FIG. 3.

Please go back to FIG. 1A and FIG. 1B. In the present embodiment, the projector 100 further includes an integrator 160. The integrator 160 is disposed on the path of the light L, and the integrator 160 and the light-emitting device 110 is located at opposite sides of the color wheel 120. In other words, the integrator 160 receives light L that passes through the color wheel 120, and integrates the light L. In particular, the integrator 160 is an integrated rod, or any other device that is capable of integrating the light L.

As shown in FIG. 1A and FIG. 1B, various modulating elements may be additionally installed before or behind the integrator 160 to modulate properties of the light L. For example, a band-pass filter may be implemented as the modulating element. The band-pass filter permits most of the visible lights (with wavelength about 380 nm to 780 nm) pass through, but infrared light and ultra-violet light would be blocked, so as to prevent them from disturbing the rear light path of the projector 100.

As the state shown in FIG. 1A, the switching module 140 makes the notch filter 130 leave the path of the light L, and thus the light L enters the integrator 160 right after passing through the color wheel 120. In the end, the light L is projected from the projector 100 to an outside projection plane to achieve a projection function of the projector 100.

In contrast, as the state shown in FIG. 1B, the switching module 140 moves the notch filter 130 so as to make the notch filter 130 locate on the path of the light L, and thus after passing through the color wheel 120, the light L would pass through the notch filter 130. At this state, the notch filter 130 may be regarded as the modulating element of the projector 100. The notch filter 130 is also called a narrow band filter, which only cuts off a specific waveband of the light L.

Figure 4A:
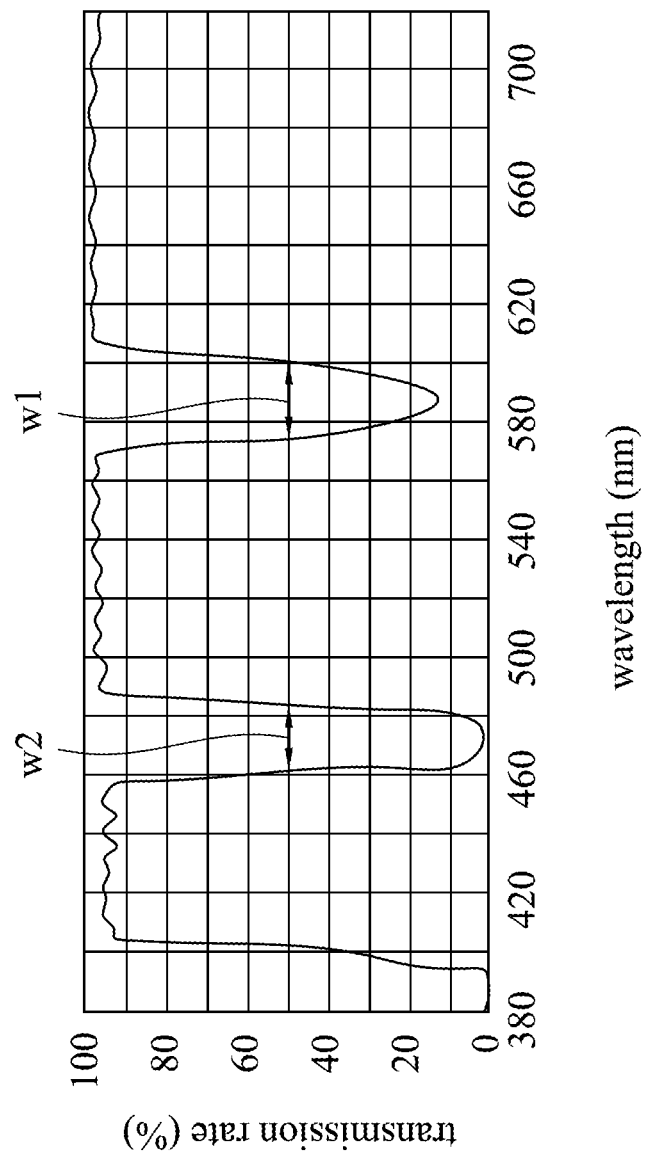
FIG. 4A illustrates a wavelength-transmission rate diagram of the notch filter shown in FIG. 1A.
Figure 4C:
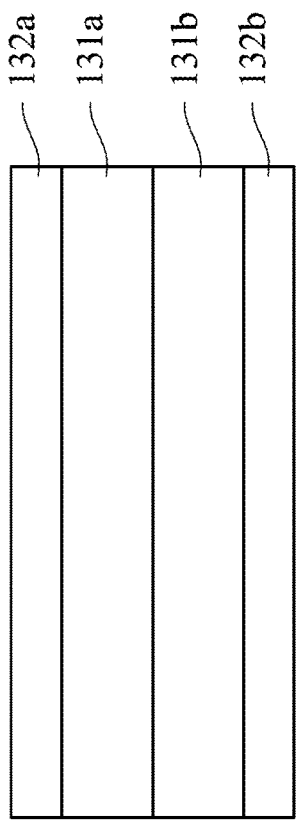
FIG. 4C illustrates a cross-section view of a notch filter according to another embodiment of the present disclosure.
Figure 4B:
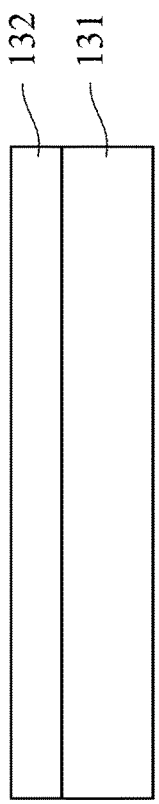
FIG. 4B illustrates a cross-sectional view of the notch filter shown in FIG. 1A.

Please refer to FIG. 4A and FIG. 4B. FIG. 4A illustrates a wavelength-transmission rate diagram of the notch filter 130 shown in FIG. 1B. FIG. 4B illustrates a cross-sectional view of the notch filter 130 shown in FIG. 1A. As shown in FIG. 4A, there are two recessing parts in the diagram, which means the notch filter 130 of the present embodiment has two cut-off wavebands. In particular, the notch filter 130 may be made by coating process, and the location of the cut-off wavebands in the figures may be adjusted according to practical need.

As shown in FIG. 4B, the notch filter 130 includes a transparent substrate 131 and a coating layer 132. The coating layer 132 is disposed on the transparent substrate 131. The coating layer 132 is designed to make the notch filter 130 with a wavelength-transmission rate relationship as shown in FIG. 4A. In other words, the coating layer 132 has two notches itself (as those shown in FIG. 4A), and the two notches are referred as a first cut-off waveband w1 and a second cut-off waveband w2.

In some embodiments, the notch filter 130 has a plurality of transparent substrates, and coating layers that are separated from each other. Please refer to FIG. 4C, which illustrates a cross-section view of a notch filter 130 according to another embodiment of the present disclosure. As shown in FIG. 4C, the notch filter 130 includes a first transparent substrate 131a, a first coating layer 132a, a second transparent substrate 131b, and a second coating layer 132b. The first coating layer 132a is disposed on the first transparent substrate 131a. The second coating layer 132b is disposed on the second transparent substrate 131b. The first transparent substrate 131a and the second transparent substrate 131b are attached to each other. The difference between the embodiment shown in FIG. 4C and FIG. 4B lies in that the first coating layer 132a and the second coating layer 132b filter out the two cut-off wavebands respectively. As shown in FIG. 4A, the first coating layer 132a filters out the first cut-off waveband w1, and the second coating layer 132b filters out the second cut-off waveband w2.

Any element that is capable of filtering out the cut-off waveband would be appropriate to be implemented as the notch filter 130. As the state shown in FIG. 1B, after the light L passes through the notch filter 130, correspondent waveband of the light L would be filtered out. The notch filter 130 improves the primary colors generated by the color wheel 120 with an enhanced purity, and the reason may be explained by Table 1 and paragraphs below.

TABLE 1

| Color | Waveband |
| --- | --- |
| Purple | 380 nm-450 nm |
| Blue | 450 nm-475 nm |
| Cyan | 476 nm-495 nm |
| Green | 495 nm-570 nm |
| yellow | 570 nm-590 nm |
| Orange | 590 nm-620 nm |
| Red | 620 nm-750 nm |

Table 1 illustrates relationship between color lights and their corresponding waveband. In the present embodiment, after the light L passes through the color wheel 120, the red, green, and blue lights may not strictly corresponds to the waveband as shown in Table 1. For example, after the light L passes through the blue-pass area of the color wheel 120, the light L may be changed into a blue light with wavelength between 380 nm to 495 nm. However, as shown in Table 1, the range of the wavelength (380 nm to 495 nm) corresponds to purple, blue, and cyan, which means the blue light remained after the filtering of the color wheel 120 is actually a blending of the three color lights, and it would appear as an impure blue in human eyes. A method to improve the aforementioned problem is to filter out the purple and cyan light. In other words, by designing the two cut-off wavebands of the notch filter 130 to be the purple waveband and the cyan waveband respectively, the purity of the blue light would be significantly enhanced. The purity of the red light or the green light may be enhanced in a similar manner (by correspondingly adjusting the cut-off waveband of the notch filter 130). In sum, if the cut-off waveband is designed between wavebands of two adjacent primary colors, then the aforementioned advantages may be expected.

The above paragraph explains the principle of the notch filter 130. However, it should be noted, the waveband in Table 1 is only for example, the cut-off wavebands of the notch filter 130 may vary depending on practice. In other aspect, as the notch filter 130 filters out a particular waveband of the light L, an intensity of the light L would be reduced in general, and thus it should be taken into consideration if the notch filter 130 removes too much portion of the light L. If too much portion is removed, then the projector 100 may fail to achieve luminosity standard. In practice, the cut-off waveband may be adjusted according to different projector standards, and the present disclosure is not limited thereto.

For example, as shown in FIG. 4A, the first cut-off waveband w1 of the notch filter 130 has a range between 575 nm to 600 nm. In other words, two half transmission wavelengths (the so called T50%) at two sides of the cut-off waveband are 575 nm and 600 nm respectively. In other aspect, the second cut-off waveband w2 has a range between 460 nm to 485 nm, and two half transmission wavelengths at two sides of the cut-off waveband are 460 nm and 485 nm respectively.

As above, in the state shown in FIG. 1A, since the light L does not pass through the notch filter 130, and thus higher intensity is retained; and in the state shown in FIG. 1B, since the light L pass through the notch filter 130, and thus portions of the light L are filtered out and result in a light intensity reduction, but in contrast, the generated primary colors possess better purity, and thus achieving a better color gamut.

Under such design, the projector 100 may be adapted to various projection circumstances without changing the color wheel 120 and the light modulating elements. For example, when using the projector 100 to deliver a presentation in a conference, it is required a high luminosity while a requirement of a chromaticity is relatively low. In such situation, the notch filter 130 may be moved away from the path of the light L by the switching module 140 to make the projector 100 achieve a high intensity mode as shown in FIG. 1A. In other applications, such as playing photo, video, or movie, the requirement of the chromaticity of the projector 100 is desired, and thus the notch filter 130 may be moved to the path of the light L by the switching module 140 to make the projector 100 achieve a high chromaticity mode. In sum, users may use the switching module 140 to switch the projector 100 between the high intensity mode and the high chromaticity mode.

Besides using the switching module 140 to switch the projector 100 between the high intensity mode and the high chromaticity mode, the light controller 150 is further installed to improve a projection performance of the projector 100 in both modes. In particular, the light controller 150 would adjust the intensity of the light L in different timings according to the activated mode, details would be described as follows.

Figure 5A:
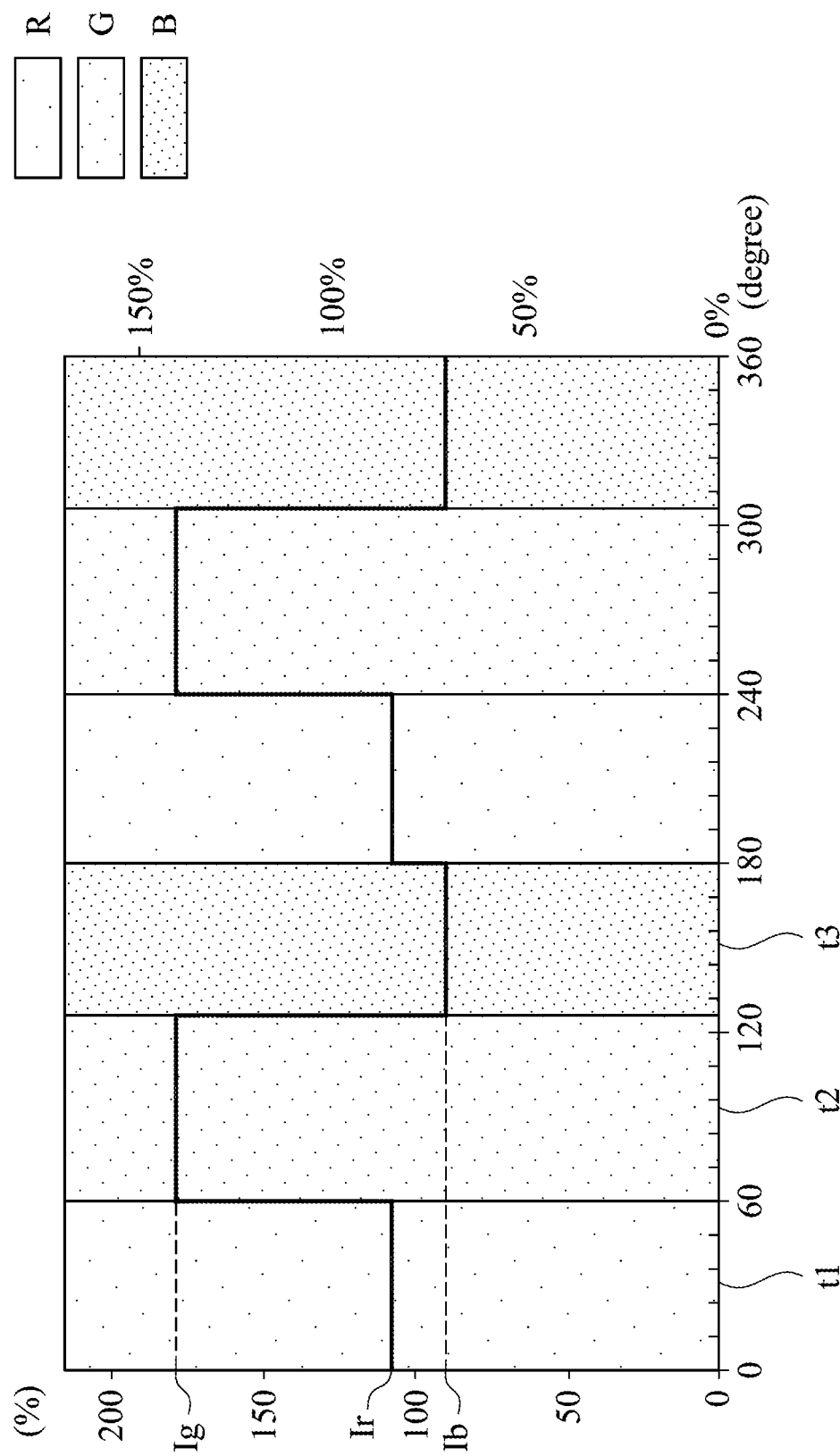
FIG. 5A illustrates a time-current intensity diagram of the light-emitting device controlled by the light controller when the projector is in the state shown in FIG. 1A.

Please refer to FIG. 5A, which illustrates a time-current intensity diagram of the light-emitting device 110 controlled by the light controller 150 when the projector 100 is in the state shown in FIG. 1A. As shown in FIG. 5A, in the present embodiment, in the first timing t1, the light-emitting device 110 emits the light L with a first current intensity Ir for making the light L become red light after passing through the color wheel 120; in the second timing t2, the light-emitting device 110 emits the light L with a second current intensity Ig for making the light L become green light after passing through the color wheel 120; and in the third timing t3, the light-emitting device 110 emits the light L with a third current intensity Ib for making the light L become blue light after passing through the color wheel 120.

As shown in FIG. 5A, as the notch filter 130 is located off the path of the light L, the light controller 150 is configured to control the light-emitting device 110 and make the second current intensity Ig greater than the first current intensity Ir, and the first current intensity Ir greater than the third current intensity Ib. In other words, the green light projected from the projector 100 is enhanced. Since human eyes are more sensitive to green light, the projector 100 may efficiently provide a high intensity projection.

Figure 5B:
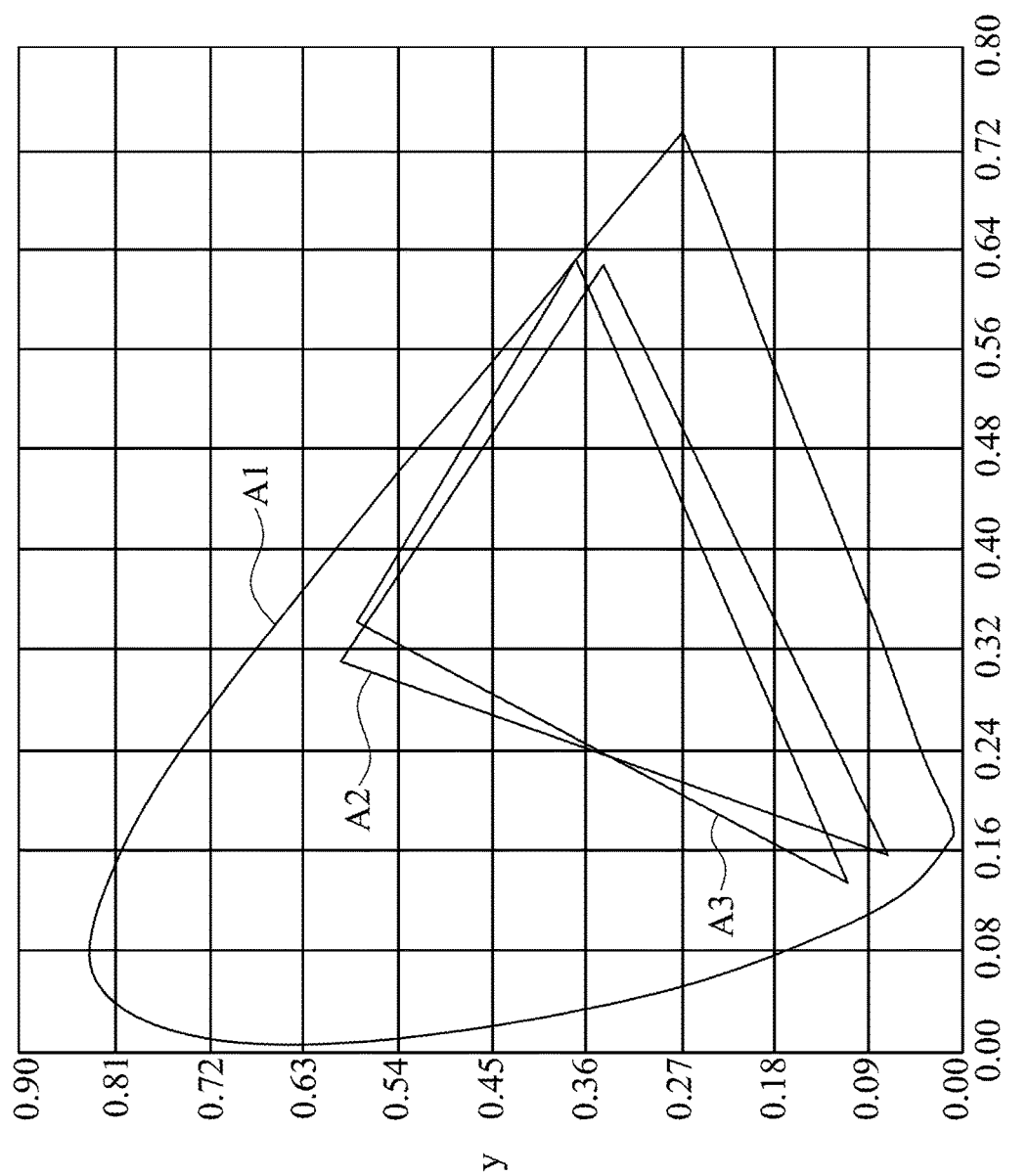
FIG. 5B illustrates a color gamut of the projector with configuration as shown in FIG. 1A and FIG. 5A.

Please refer to FIG. 5B, which illustrates a color gamut of the projector 100 with configuration as shown in FIG. 1A and FIG. 5A. In other words, FIG. 5B illustrates a color gamut of the projector 100 that is in a high intensity mode. As shown in FIG. 5B, the color gamut includes area A1, area A2, and area A3, in which the area A1 represents a color space of CIE 1931, the area A2 represents a color space of Rec 709 standard, and the area A3 represents a color space generated by the projector 100 with configuration as shown in FIG. 1A and FIG. 5A.

As shown in FIG. 5B, the area A3 does not entirely cover the color space (the area A2) required by the Rec 709 standard, which means the color gamut of the projector 100 does not achieve a chromaticity that is required by high level video play. However, as mentioned above, although the primary colors generated in the high intensity mode have a lower purity, they retain a relative high intensity, which would be advantageous under certain circumstances. For example, under situations that most of the projected contents are texts, the projector 100 would be able to exhibit a high intensity contrast, which would greatly enhance the sharpness of the texts.

Figure 6A:
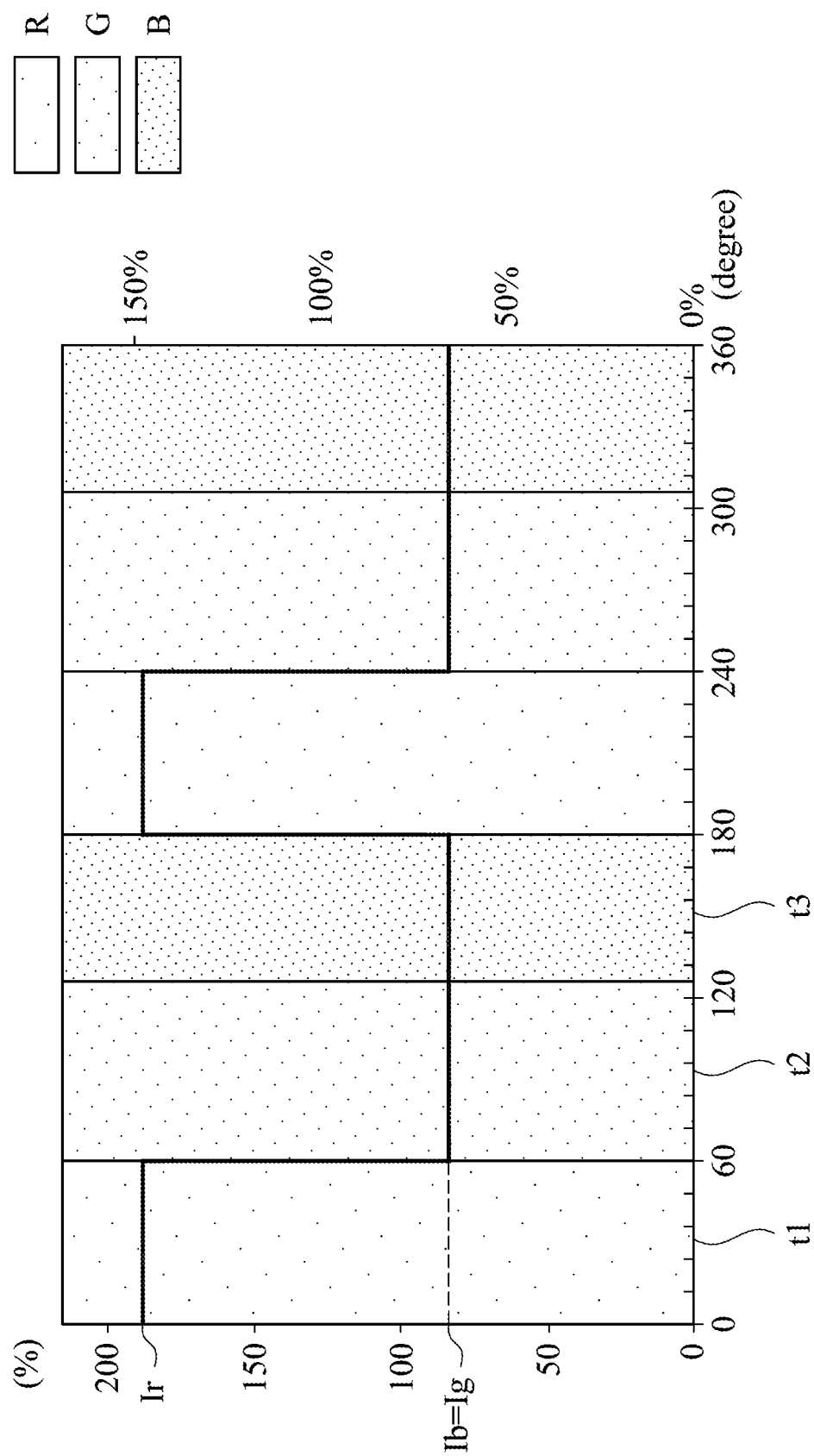
FIG. 6A illustrates a time-current intensity diagram of the light-emitting device controlled by the light controller when the projector is in the state shown in FIG. 1B.

Please refer to FIG. 6A, which illustrates a time-current intensity diagram of the light-emitting device 110 controlled by the light controller 150 when the projector 100 is in the state shown in FIG. 1B. As shown in FIG. 6A, when the notch filter 130 is located on the path of the light L, the light controller 150 is configured to control the light-emitting device 110 to make the first current intensity Ir greater than the third current intensity Ib, and the third current intensity Ib equal to the second current intensity Ig. In other words, the red light projected by the projector 100 is enhanced. With reference made to FIG. 2, in which it may be seen the light L has a relative low intensity within the waveband corresponding to the red light (right side within the figure). In aspect of achieving a high chromaticity and a good white balance, intensity differences among the three primary colors would be preferred to be as low as possible. As a result, by enhancing the intensity of the waveband corresponding to the red light, the projector 100 may efficiently provide a high chromaticity projection.

Figure 6B:
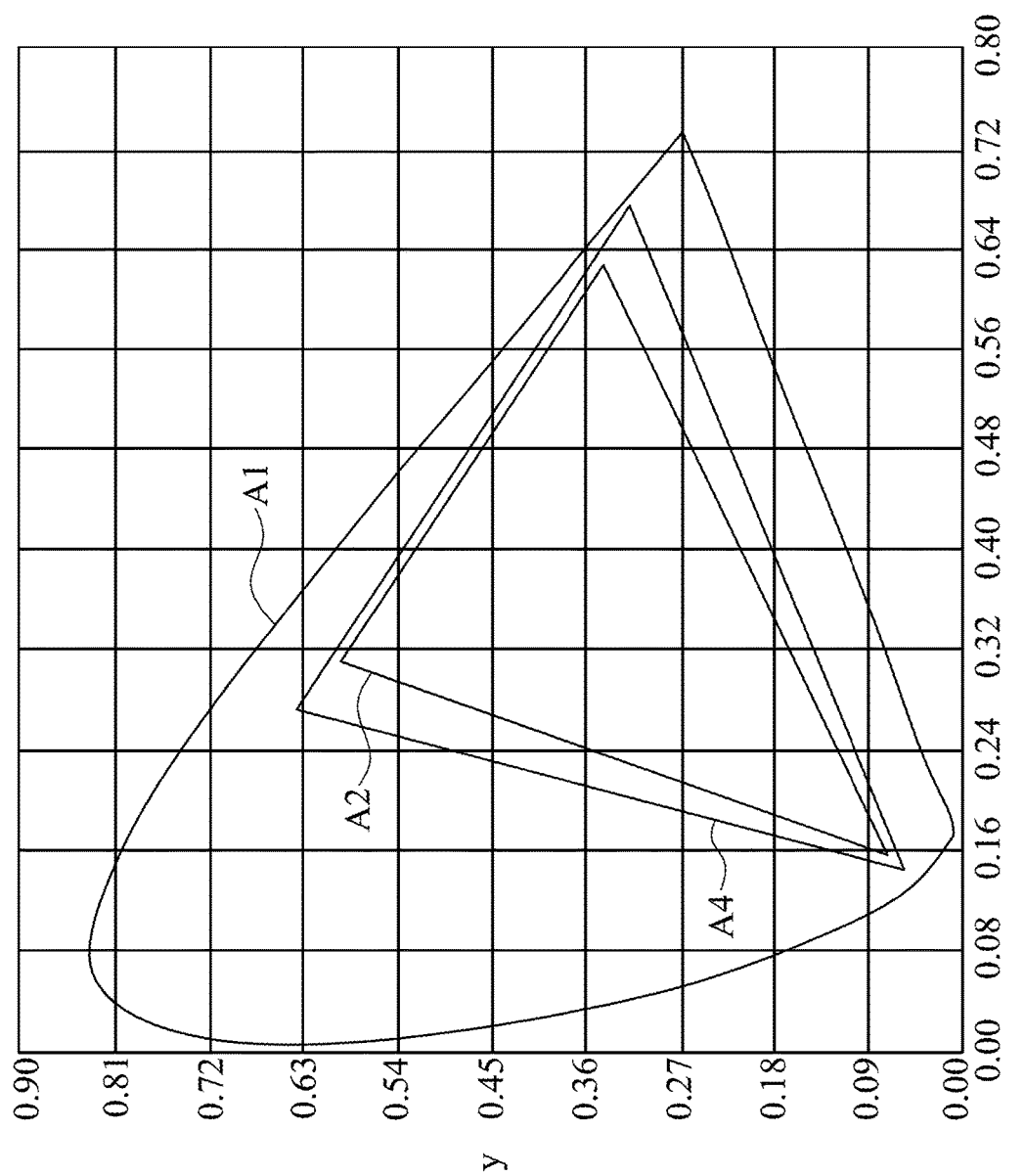
FIG. 6B illustrates a color gamut of the projector with configuration as shown in FIG. 1B and FIG. 6A.

Please refer to FIG. 6B, which illustrates a color gamut of the projector 100 with configuration as shown in FIG. 1B and FIG. 6A. In other words, FIG. 6B illustrates a color gamut of the projector 100 in the high chromaticity mode. As shown in FIG. 6B, the color gamut includes an area A1, an area A2, and an area A4, in which the area A1 represents a color space of CIE 1931, the area A2 represents a color space of Rec 709 standard, and the area A4 represents the color space generated by the projector 100 with configuration as shown in FIG. 1B and FIG. 6A.

As shown in FIG. 6B, the area A4 entirely covers the color space (the area A2) that is required by the Rec 709 standard. In other words, although the projection intensity of the projector 100 is relative low in the high chromaticity mode, the color gamut of the projector 100 successfully reaches the chromaticity requirement of the high level video play.

It should be understood that, by using the light controller 150 to adjust the relative intensity of the light L emitted by the light-emitting device 110, the chromaticity and the intensity of the projector 100 may be additionally adjusted. In certain situations, the chromaticity and the intensity requirement may be intermediate between the high intensity mode and the high chromaticity mode. Under such situation, one may combine the configuration of the high intensity mode and the configuration of the high chromaticity mode to achieve practical needs.

Figure 7:
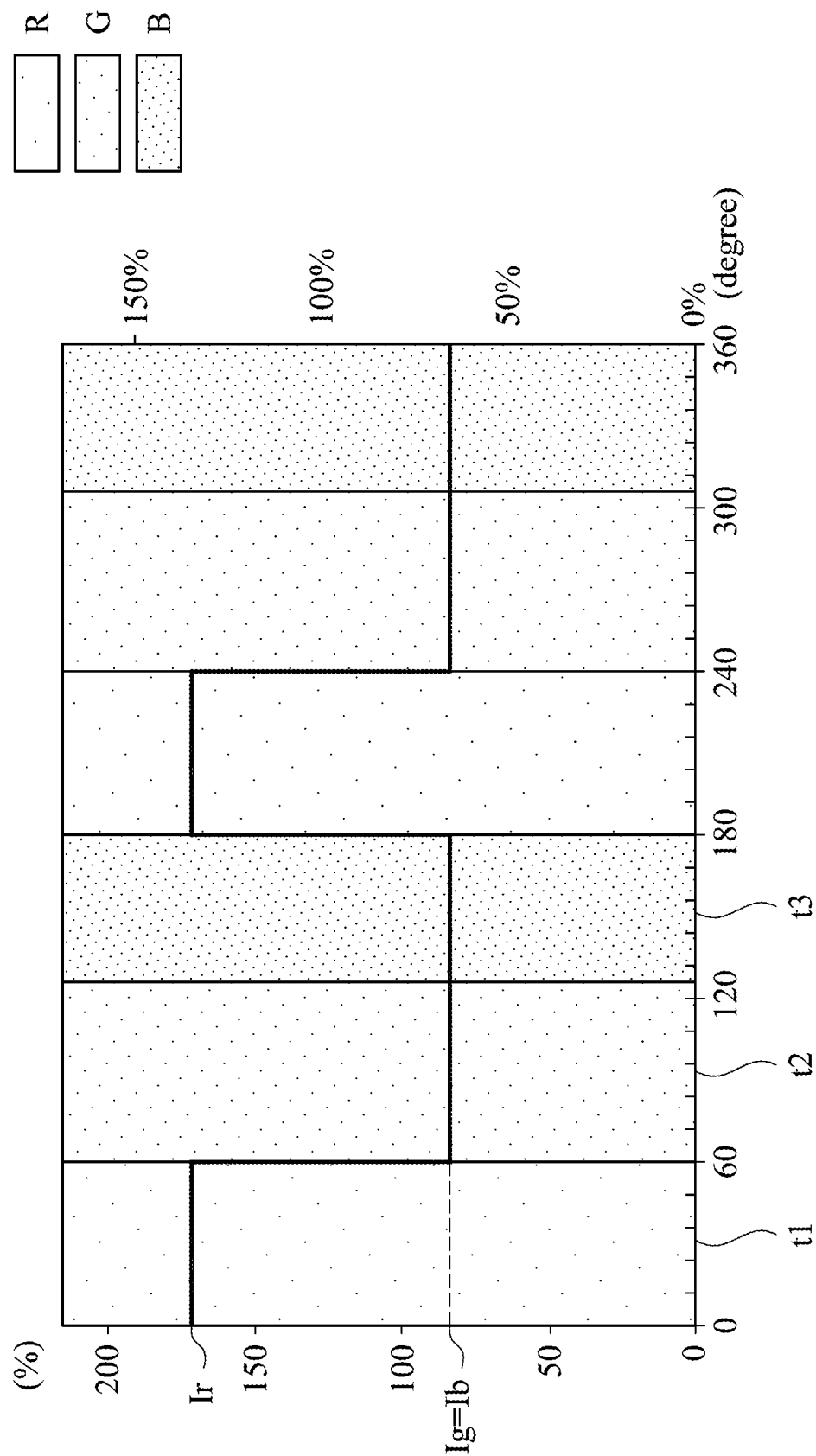
FIG. 7 illustrates a time-current intensity diagram of the light-emitting device controlled by the light controller when the projector is in the state shown in FIG. 1A.

For example, please refer to FIG. 7, which illustrates a time-current intensity diagram of the light-emitting device 110 controlled by the light controller 150 when the projector 100 is in the state shown in FIG. 1A. As shown in FIG. 7, a relative intensity in different timings of the light L emitted by the light-emitting device 110 is similar to the relative intensity that is shown in FIG. 6A. In other words, the first current intensity Ir is greater than the third current intensity Ib, and the third current intensity Ib is greater than the second current intensity Ig.

In the configuration shown in FIG. 1A, the notch filter 130 is removed to make the projector 100 project with a higher intensity, and in the configuration shown in FIG. 6A, the red light intensity is enhanced to make the projector 100 project with a better white balance. In other words, the embodiment shown in FIG. 7 combines the pros and cons of the high intensity mode shown in FIG. 1A and the high chromaticity mode shown in FIG. 6A, and as a result, an intensity, chromaticity, and white balance of the projector 100 as shown in FIG. 7 are intermediate between the those in the high intensity mode and in the high chromaticity mode. The present configuration is denoted as an intermediate mode, which is suitable for playing photos, pictures, and so on.

When the projector 100 is in a state as shown in FIG. 1A or FIG. 1B, some preferred settings controlled by the light controller 150 are disclosed as above. It should be noted, when the projector 100 is in a state as shown in FIG. 1A or FIG. 1B, the light controller 150 may arbitrarily be installed with settings shown in FIG. 5A, FIG. 6A, or FIG. 7. In other words, only three modes (the high intensity modes, the high chromaticity mode, and the intermediate mode) are exemplified in the disclosure, but other combinations are also possible. For example, there should be at least 6 modes in total. The three modes that are not described in details above include: the configuration of FIG. 1A implemented with settings shown in FIG. 6A; the configuration of FIG. 1B implemented with settings shown in FIG. 5A; and the configuration of FIG. 1B implemented with settings shown in FIG. 7. In addition, settings of the light controller 150 may be changed according to practical needs, and the present disclosure is not limited to those illustrated in FIG. 5A, FIG. 6A, and FIG. 7.

One embodiment of the projector 100 is briefly described as above. In sum, if the notch filter 130 is off the path of the light L, and the light controller 150 is installed with the setting shown in FIG. 5A, then the projector 100 would be switched into the high intensity mode; if the notch filter 130 is located on the path of the light L, and the light controller 150 is installed with the setting shown in FIG. 6A, then the projector 100 would be switched into the high chromaticity mode; and if the notch filter 130 is located off the path of the light L, but the light controller 150 is installed with the setting shown in FIG. 7, then the projector 100 would be switched into the intermediate mode. As above, by using the switching module 140 and the light controller 150 to adjust projection property of the projector 100, the user may easily apply the projector 100 to different situations.

People skilled in the art may make various changes without departing from spirit and scope of the present disclosure. For example, the type of the color wheel 120 may be changed, and setting of the light controller 150 may also be correspondingly adjusted. A projector according to another embodiment of the present disclosure would be described with references made to figures and paragraphs as follows.

Figure 8:
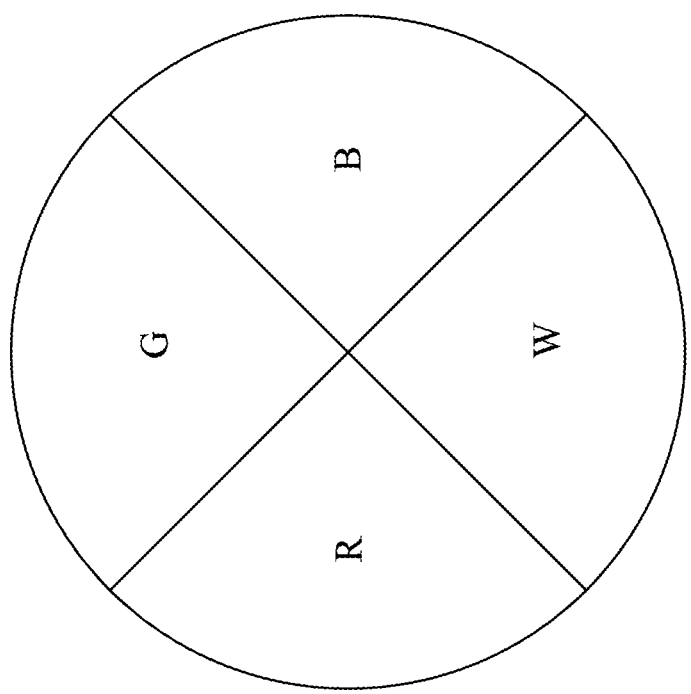
FIG. 8 illustrates a plane view of another embodiment of the color wheel shown in FIG. 1.

Please refer to FIG. 8, which illustrates a plane view of another embodiment of the color wheel 120 shown in FIG. 1. As shown in FIG. 8, the color wheel 120 is changed from a tri-color color wheel to a four-color color wheel, which includes four light-pass areas, and the light-pass areas permits light with different wavebands to pass through respectively. In particular, the four light-pass areas are red-pass area, blue-pass area, green-pass area, and white-pass area respectively, as such making the light L to become different color lights (red, green, blue, and white). The principle of the color wheel 120 has been described in paragraphs relative to FIG. 3, and thus not repeats herein.

In this embodiment, the color wheel 120 is a four-color color wheel, which includes an additional white-pass area, and thus the light controller 150 should be correspondingly set. Please refer to FIG. 9 to FIG. 11, each of which illustrates a time-current intensity diagram of the light-emitting device 110 controlled by the light controller 150 when the projector 100 is in different modes.

Figure 9:
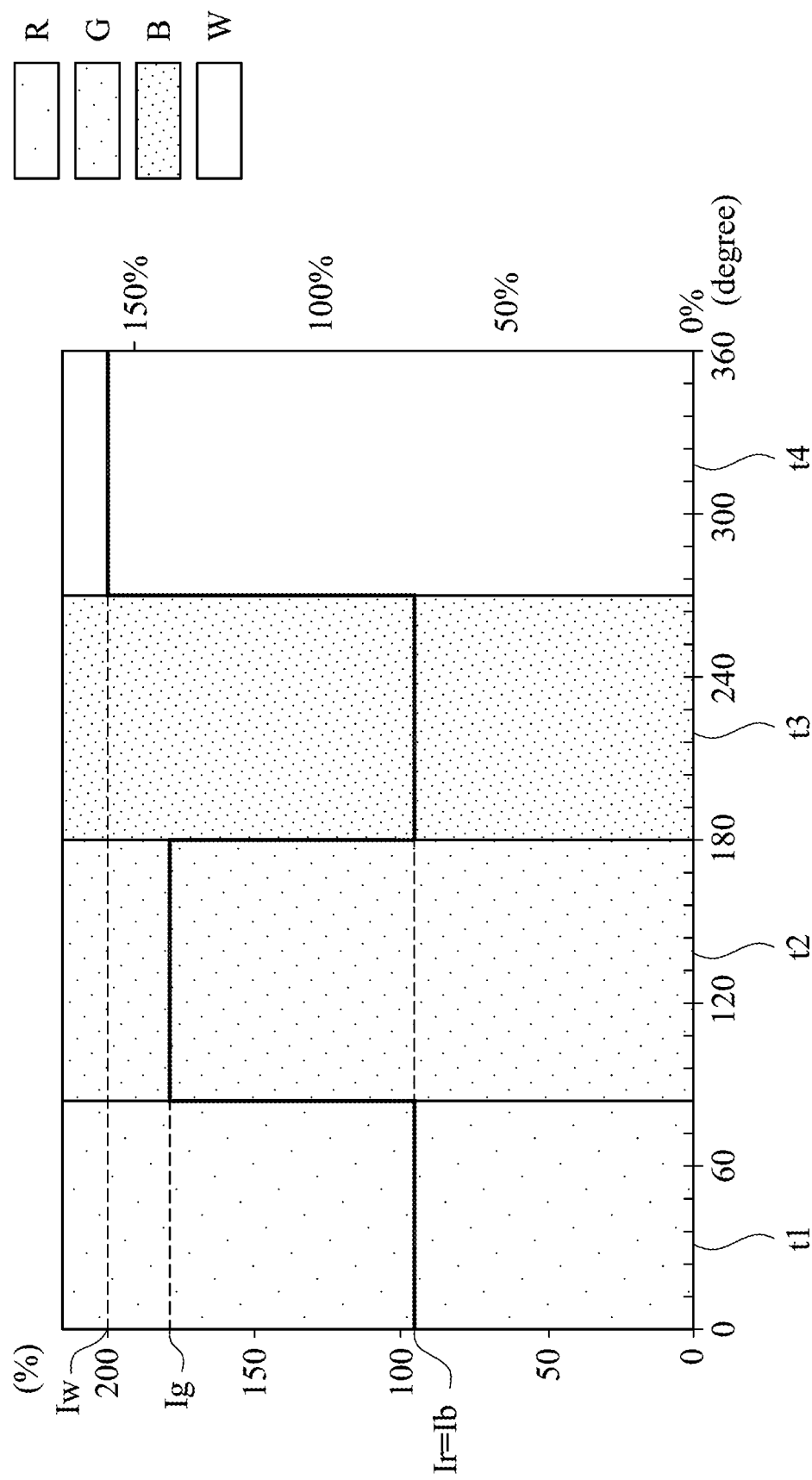
FIG. 9 illustrates a time-current intensity diagram of the light-emitting device controlled by the light controller when the projector is in the high intensity mode.

Please refer to FIG. 9, which illustrates a time-current intensity diagram of the light-emitting device 110 controlled by the light controller 150 when the projector 100 is in the high intensity mode. As the present embodiment shown in FIG. 9, in the first timing t1, the light-emitting device 110 emits the light L with a first current intensity Ir for making the light L become red light after passing through the red-pass area of the color wheel 120; in the second timing t2, the light-emitting device 110 emits the light L with a second current intensity Ig for making the light L become green light after passing through the green-pass area of the color wheel 120; in the third timing t3, the light-emitting device 110 emits the light L with a third current intensity Ib for making the light L become blue light after passing through the blue-pass area of the color wheel 120; and in the fourth timing t4, the light-emitting device 110 emits the light L with a fourth current intensity Iw for making the light L become white light after passing through the white-pass area of the color wheel 120.

As shown in FIG. 9, in the embodiment that the color wheel 120 is the four-color color wheel, when the projector 100 is switched to the high intensity mode, the light controller 150 is configured to control the light-emitting device 110 as such making the fourth current intensity Iw greater than the second current intensity Ig, the second current intensity Ig greater than the third current intensity Ib, and the third current intensity Ib equal to the first current intensity Ir. In other words, besides the intensity of the green light is enhanced, the intensity of the white light is also enhanced. The white light may be used to enhance an overall intensity of the projection of the projector 100, and thus the projector 100 may achieve an even higher intensity performance.

Figure 10:
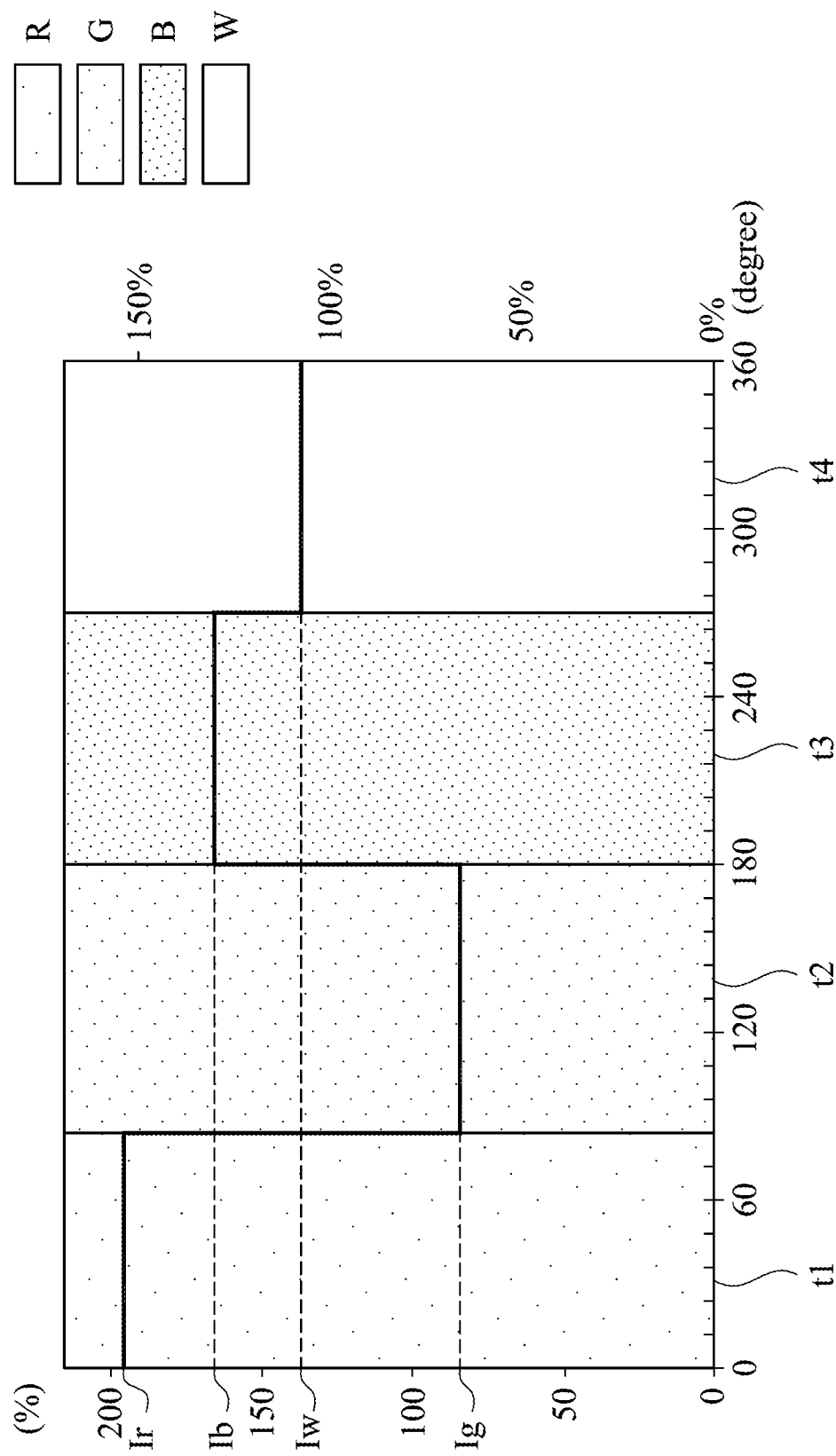
FIG. 10 illustrates a time-current intensity diagram of the light-emitting device controlled by the light controller when the projector is in the high chromaticity mode.

Please refer to FIG. 10, which illustrates a time-current intensity diagram of the light-emitting device 110 controlled by the light controller 150 when the projector 100 is in the high chromaticity mode. As shown in FIG. 10, in the embodiment that the color wheel 120 is the four-color color wheel, when the projector 100 is switched to the high chromaticity mode, the light controller 150 is configured to control the light-emitting device 110 as such making the first current intensity Ir greater than the third current intensity Ib, the third current intensity Ib greater than the fourth current intensity Iw, and the fourth current intensity Iw greater than the second current intensity Ig. In other words, the portion of the red light is increased in general, and thus the chromaticity of the projector 100 is enhanced (reasons has been described formerly).

Figure 11:
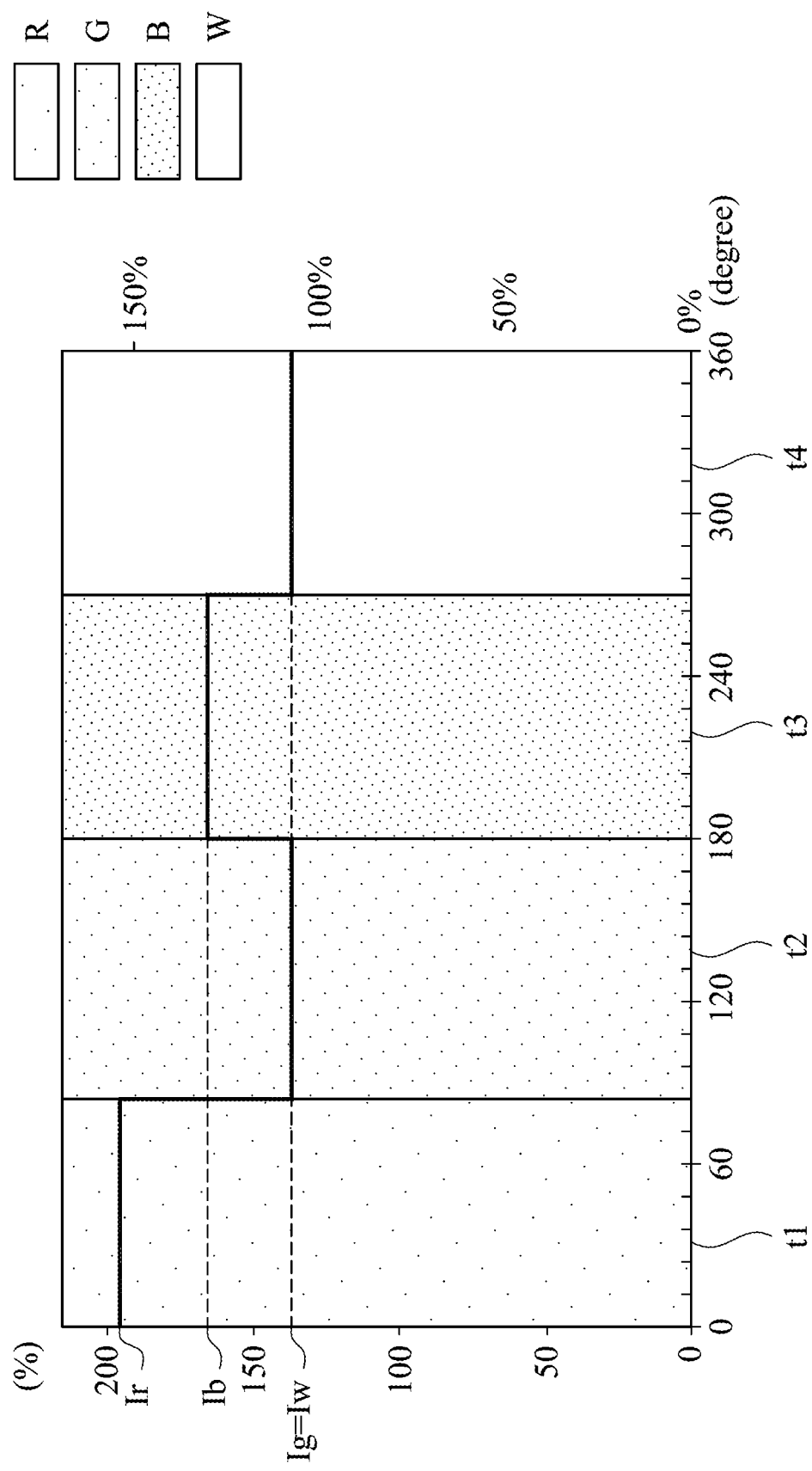
FIG. 11 illustrates a time-current intensity diagram of the light-emitting device controlled by the light controller when the projector is in the intermediate mode.

Please refer to FIG. 11, which illustrates a time-current intensity diagram of the light-emitting device 110 controlled by the light controller 150 when the projector 100 is in the intermediate mode. As shown in FIG. 11, in the embodiment that the color wheel 120 is the four-color color wheel, when the projector 100 is switched to the intermediate mode, the light controller 150 is configured to control the light-emitting device 110 as such making the first current intensity Ir greater than the third current intensity Ib, the third current intensity Ib greater than the second current intensity Ig, and the second current intensity Ig generally equal to the fourth current intensity Iw. In other words, the embodiment as shown in FIG. 11 combines the pros and cons of the high intensity mode and the high chromaticity mode, and thus making the projector 100 provide an intensity and chromaticity between those provided in the high intensity mode and in the high chromaticity mode.

In this paragraph, the projector 100 with the notch filter 130 is compared with a projector without the notch filter 130, and the numerical result is listed in Table 2 as below. Table 2 lists the intensity and chromaticity efficiency of the projector 100 with the notch filter 130 and the projector without the notch filter.

TABLE 2

| Projector | Mode | | | |
|---|---|---|---|---|
| | High intensity | Intermediate | High chromaticity | Rec709 |
| without notch filter | 100% | 79% | | 82% |
| with notch filter | 81% | 64% | 61% | 102% |

As shown in Table 2, in comparison with the projector without a notch filter, the projector 100 with the notch filter 130 may entirely cover (102%) the color space required by the Rec 709 standard. In sum, it is evidence that the notch filter 130 provided by the present disclosure may improve the color gamut of the projector 100. Also, the notch filter 130 has a relative small thickness and high transparency, and thus the intensity drop is acceptable (100%→81% and 79%→64%).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projector, comprising:
a light-emitting device configured to emit a light;
a color wheel disposed on a path of the light and configured to produce lights with different color wavebands;
a notch filter having two cut-off wavebands, each located between adjacent two of the color wavebands, wherein the color wavebands comprise a red waveband, a green waveband, a blue waveband, and a white waveband, and one of the cut-off wavebands of the notch filter is located between the red waveband and the green waveband, and the other one of the cut-off wavebands of the notch filter is located between the green waveband and the blue waveband;
a switching module configured to move the notch filter to or away the path of the light; and
a light controller electrically connected to the light-emitting device and the switching module, and configured to control an intensity of the light-emitted by the light-emitting device.

2. The projector of claim 1, wherein two half-transmission wavelengths (T50%) of one of the cut-off waveband of the notch filter are 460 nm and 485 nm respectively, and two half-transmission wavelengths (T50%) of the other one of the cut-off waveband of the notch filter are 575 nm and 600 nm respectively.

3. The projector of claim 1, wherein when the notch filter is located off the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the white waveband, wherein the fourth current intensity is greater than the second current intensity, the second current intensity is greater than the first current intensity, and the first current intensity is equal to the third current intensity.

4. The projector of claim 1, wherein when the notch filter is located off the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the whit waveband, wherein the first current intensity is greater than the third current intensity, the third current intensity is greater than the second current intensity, and the second current intensity is greater than the fourth current intensity.

5. The projector of claim 1, wherein when the notch filter is located on the path of the light, the light controller is configured to control the light-emitting device to emit the light with a first current intensity when the color wheel produces the light with the red waveband; to emit the light with a second current intensity when the color wheel produces the light with the green waveband; to emit the light with a third current intensity when the color wheel produces the light with the blue waveband; and to emit the light with a fourth current intensity when the color wheel produces the light with the whit waveband, wherein the first current intensity is greater than the third current intensity, the third current intensity is greater than the fourth current intensity, and the fourth current intensity is greater than the second current intensity.

6. The projector of claim 1, wherein the notch filter further comprises:
a transparent substrate; and
a coating layer disposed on the transparent substrate and having characteristics of the cut-off wavebands.

7. The projector of claim 1, wherein the notch filter further comprises:
a first transparent substrate;
a first coating layer disposed on the first transparent substrate and having a characteristic of one of the cut-off wavebands; and
a second coating layer disposed on the second transparent substrate and having a characteristic of another one of the cut-off wavebands,
wherein the second transparent substrate is attached to the first transparent substrate.

8. A projector, comprising:
a light-emitting device configured to emit a light;
a color wheel disposed on a path of the light and configured to produce lights with different color wavebands;
a notch filter having two cut-off wavebands, each located between adjacent two of the color wavebands, wherein the color wavebands comprise a red waveband, a green waveband, and a blue waveband, and one of the cut-off wavebands of the notch filter is located between the red waveband and the green waveband, and the other one of the cut-off wavebands of the notch filter is located between the green waveband and the blue waveband;
a switching module configured to move the notch filter to or away the path of the light; and
a light contoller electrically connected to the light-emitting device and the switching module, and configured to control an intensity of the light-emitted by the light-emitting device.

9. The projector of claim 8, wherein two half-transmission wavelengths (T50%) of one of the cut-off waveband of the notch filter are 460 nm and 485 nm respectively, and two half-transmission wavelengths (T50%) of the other one of the cut-off waveband of the notch filter are 575 nm and 600 nm respectively.

10. The projector of claim 8, wherein when the notch filter is located on the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband, wherein the first current intensity is greater than the second current intensity, and the second current intensity is equal to the third current intensity.

11. The projector of claim 8, wherein when the notch filter is located off the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband, wherein the second current intensity is greater than the first current intensity, and the first current intensity is greater than the third current intensity.

12. The projector of claim 8, wherein when the notch filter is located on the path of the light, the light controller is configured to control the light-emitting device to emit the light with a first current intensity when the color wheel produces the light with the red waveband; to emit the light with a second current intensity when the color wheel produces the light with the green waveband; and to emit the light with a third current intensity when the color wheel produces the light with the blue waveband, wherein the first current intensity is greater than the second current intensity, and the second current intensity is equal to the third current intensity.

* * * * *